(12) United States Patent
Chalemin et al.

(10) Patent No.: US 7,883,029 B2
(45) Date of Patent: Feb. 8, 2011

(54) IRRIGATION SYSTEM AND METHODOLOGY

(75) Inventors: Glen Edmond Chalemin, Austin, TX (US); Indran Naick, Cedar Park, TX (US); Clifford Jay Spinac, Austin, TX (US); Calvin Lui Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 11/690,283

(22) Filed: Mar. 23, 2007

(65) Prior Publication Data

US 2008/0234870 A1 Sep. 25, 2008

(51) Int. Cl.
*A01G 27/00* (2006.01)

(52) U.S. Cl. .............. 239/67; 239/69; 239/70; 239/73; 700/283; 700/282

(58) Field of Classification Search ............ 239/67, 239/68, 69, 70, 71, 2.1, 530, 63, 64, 65, 73; 700/282, 284, 283
See application file for complete search history.

(56) References Cited

U.S. PATENT DOCUMENTS

| | | | |
|---|---|---|---|
| 5,097,861 A * | 3/1992 | Hopkins et al. | 137/78.3 |
| 5,152,006 A * | 9/1992 | Klaus | 455/574 |
| 5,813,606 A | 9/1998 | Ziff | |
| 6,098,898 A * | 8/2000 | Storch | 239/69 |
| 6,343,255 B1 | 1/2002 | Peek | |
| 6,675,098 B2 * | 1/2004 | Peek et al. | 702/3 |
| 6,784,786 B1 * | 8/2004 | Sumner | 340/10.32 |
| 6,823,239 B2 | 11/2004 | Sieminski | |
| 6,895,987 B2 | 5/2005 | Addink | |
| 6,977,351 B1 * | 12/2005 | Woytowitz | 200/61.04 |
| 7,010,394 B1 | 3/2006 | Runge | |
| 7,058,478 B2 * | 6/2006 | Alexanian | 700/284 |
| 7,146,254 B1 * | 12/2006 | Howard | 700/284 |
| 7,203,576 B1 * | 4/2007 | Wilson et al. | 700/284 |
| 7,266,428 B2 * | 9/2007 | Alexanian | 700/284 |

(Continued)

OTHER PUBLICATIONS

Butcher—"Intelligent, Automatic, Internet Enabled X10 Controlled Water Saving Sprinklers", (downloaded from http://www.los-gatos.ca.us/davidbu/sprinklers.html on Nov. 29, 2006).

(Continued)

*Primary Examiner*—Len Tran
*Assistant Examiner*—Trevor E McGraw
(74) *Attorney, Agent, or Firm*—Diana Gerhardt; Mark P. Kahler (57) ABSTRACT

An irrigation system includes a radio transmitter station that transmits weather prediction information to a geographic region that includes multiple geographic sub-regions. The weather prediction information includes a respective geographic sub-region code for each of the geographic sub-regions for which a weather forecast predicts rain within a predetermined time period. An irrigation apparatus in a particular sub-region activates to water a watering zone at a schedule time. However, if the irrigation apparatus receives the sub-region code for the particular sub-region where the irrigation apparatus is located, the irrigation apparatus does not immediately activate to water the watering zone in one embodiment. The transmitter station may transmit both program content and data content on a common radio frequency signal wherein the data content includes the weather prediction information.

3 Claims, 5 Drawing Sheets

U.S. PATENT DOCUMENTS

| | | | | |
|---|---|---|---|---|
| 7,403,840 | B2* | 7/2008 | Moore et al. | 700/284 |
| 2003/0093159 | A1* | 5/2003 | Sieminski | 700/12 |
| 2004/0039489 | A1* | 2/2004 | Moore et al. | 700/284 |
| 2004/0225412 | A1* | 11/2004 | Alexanian | 700/284 |

OTHER PUBLICATIONS

EBU RDS—"What is RDS?", EBU and RDS Forum (Sep. 19, 2006).
FIPS—"FIPS Codes, Same, Nat'l Weather Service Alerts" (dnld www.nationalradiodata.com on Jan. 4, 2007).
Heasley—"Car of the Future", Technology—www.smh.com.au (Apr. 17, 2005).
HOW—"How is my Radio Able to Display Station's Call Letters", www.howstuffworks.com (dnld Feb. 9, 2007).
Lenkenby—"Advertising in Ubiquitous Computing Era" (Interactive Ad Seminar—Spring, 2006).
McNulty Jr.- National Weather Service Inst. 10-1712 NWR-SAME, NOAA (Feb. 17, 2006).
Mini Clik—Hunter Mini Clik Rain Sensors for Sprinkler Systems, Costless Irrigation Svc. (© 1999, 2006).
NOAA- "Using NWR SAME", National Weather Service—NOAA (Dec. 15, 2006).
Quelle—"Radio Text Plus", EBU Technical Review (Jul. 2006).
Radio—"RDS—The Radio System", (dnld from www.radio-electronics.com on Jan. 4, 2007).
Rainbird—"Rain Bird RSD Rain Sensor", (dnld from www.lawnh2o.com on Nov. 29, 2006).
RDS—"RadioText Plus (RT+) Specification, Ver. 2.1",RDS Forum (Jul. 21, 2006).
Rowan—"Media Center PCs", (dnld from www.hlp2u.com on Nov. 29, 2006).
Tana—"Adaptive Irrigation and Water Heater Control", (dnld from www.geocities.com on Nov. 29, 2006).

* cited by examiner

IRRIGATION SYSTEM AND METHODOLOGY

TECHNICAL FIELD OF THE INVENTION

The disclosures herein relate generally to irrigation systems, and more particularly to irrigation systems with programmable watering time schedules.

BACKGROUND

Modern irrigation systems such as lawn sprinklers usually include multiple watering or sprinkling zones. The user typically sets a timer to instruct the sprinkler system to water a lawn at pre-programmed times. When the timer reaches a pre-programmed time, the system cycles through watering the various sprinkling zones. In this manner, each zone receives that water that it needs.

Unfortunately, simple sprinkler systems often waste water because the programmed sprinkling time occurs immediately before, during or after a natural rainstorm event. When such a natural rainstorm event occurs, there is no need for irrigation. Unwarranted sprinkling at these times may cause significant water waste. Some modern irrigation systems address this problem by employing a rain gauge to act as a sensor that prevents the sprinkler system from activating if it collects water prior to the programmed sprinkling time. One significant drawback of this approach is that it ignores rain that occurs soon after the programmed sprinkling time. For example, it is possible that a sprinkler system employing a rain gauge sensor may water the lawn as scheduled time at 6 am when there is no water in the rain gauge. However, if a rainstorm occurs the same day at 2 pm, then the 6 am watering event represents wasted water.

What is needed is an irrigation method and apparatus that addresses the above irrigation water waste problem.

SUMMARY

Accordingly, in one embodiment, a method of irrigation is disclosed. The method includes transmitting, by a transmitter station, weather prediction information to a geographic region including a plurality of geographic sub-regions. The weather prediction information includes a respective geographic sub-region code for each of the geographic sub-regions for which a weather forecast predicts rain within a first predetermined time period. The method also includes halting activation, by an irrigation apparatus in a particular geographic sub-region, of watering devices that otherwise activate to water at least one watering zone at a scheduled time, if at least one of the following first and second conditions occurs. The first condition is receiving, by the irrigation apparatus within the particular geographic sub-region, the respective geographic sub-region code for the particular geographic sub-region, thus indicating that rain is forecast for the particular geographic sub-region within the first predetermined time period. The second condition is sensing, by a rain sensor of the irrigation apparatus within the particular geographic region, that rain water is present in the rain sensor.

In another embodiment, an irrigation apparatus is disclosed that includes a radio receiver that receives radio frequency signals that include weather prediction information, the radio receiver being usable in a particular geographic sub-region of a plurality of geographic sub-regions. The weather prediction information includes geographic sub-region codes corresponding respectively to geographic sub-regions for which a weather forecast predicts rain within a first predetermined time period. The irrigation apparatus also includes a controller, coupled to the radio receiver, that activates watering devices coupled to the controller to water at least one watering zone at a scheduled time. However, the controller prevents activation of the watering devices at the scheduled time if at least one of the following conditions occurs. A first condition is the radio receiver receiving the geographic sub-region code of the particular sub-region in which the irrigation apparatus is located, thus indicating that rain is forecast for the particular geographic sub-region within the first predetermined time period. A second condition is the controller determining that rain water is present in a rain sensor coupled to the controller.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
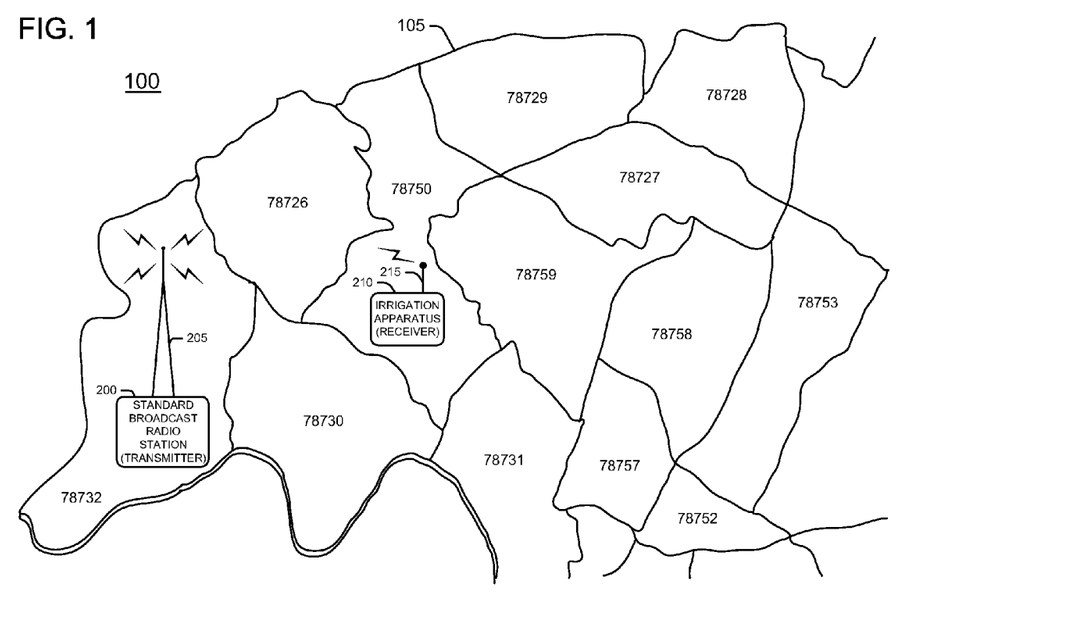
FIG. 1 shows a representation of one embodiment of the disclosed irrigation system within a geographic region that includes multiple geographic sub-regions.

FIG. 1 shows a block diagram of one embodiment of the disclosed irrigation system 100 within a geographic region 105 that includes multiple geographic areas or sub-regions. Within irrigation system 100, a different geographic code associates with each geographic sub-region. For example, in the embodiment that FIG. 1 depicts, a different geographic code such as a postal ZIP code associates with each geographic sub-region. Other geographic codes may also associate with or designate respective geographic sub-regions in system 100 as explained in more detail below. TABLE 1 shows a list of ZIP codes, each ZIP code corresponding to a respective geographic sub-region within region 105.

TABLE 1

| GEOGRAPHIC CODE |
| --- |
| 78726 |
| 78727 |
| 78728 |
| 78729 |
| 78730 |
| 78731 |
| 78732 |
| 78750 |
| 78752 |
| 78753 |
| 78757 |
| 78758 |
| 78759 |

Irrigation system 100 includes a transmitter station 200 such as a standard broadcast FM station in one embodiment. An antenna 205 couples to transmitter station 200 to transmit signals from station 200 to at least one receiving station, for example an irrigation apparatus 210, in geographic region 105. In this particular example, geographic sub-region 78750 includes irrigation apparatus 210 as shown in FIG. 1. The designation 78750 corresponds to the ZIP code of the geographic sub-region that includes irrigation apparatus 210. Irrigation apparatus 210 employs an antenna 215 to assist in the reception of geographically coded signals from transmitter station 200. In this particular example, geographic sub-region 78732 includes transmitter station 200. Transmitter station 200 transmits with sufficient effective radiated power to allow reliable reception of its radio signals by irrigation apparatus within the geographic region 105 that TABLE 1 depicts.

In one embodiment, transmitter station 200 transmits hourly a sequence of geographic codes that indicates those geographic sub-regions within region 105 that a weather forecast predicts will receive rain within the next 24 hours or other predetermined time period. For example, if at 12 noon a weather forecast predicts that it will rain within the next 24 hours in geographic sub-regions 78726, 78730 and 78750, then transmitter station 200 transmits the geographic codes 78726, 78730 and 78750. In this particular example, the geographic code (e.g. 78726) and the geographic sub-region conveniently employ the same number. One hour later at 1 pm, the weather forecast changes and now predicts that it will rain in the next 24 hours in geographic sub-regions 78730, 78750, 78759 and 78731. In that case transmitter station 200 transmits the corresponding geographic codes 78730, 78750, 78759 and 78731. One hour later at 2 pm, the weather forecast changes once again and now predicts that it will rain in geographic sub-regions 78759, 78731, 78758 and 78757 within the next 24 hours. In response to the changed weather forecast, transmitter station 200 transmits the corresponding geographic codes 78759, 78731, 78758 and 78757. In this particular example, transmitter 200 transmits updated weather prediction information hourly. However other time intervals between weather prediction updates are acceptable as well, as long as the interval between updates is less than the time period in which the weather forecast predicts rain, namely 24 hours in this particular example.

Figure 2:
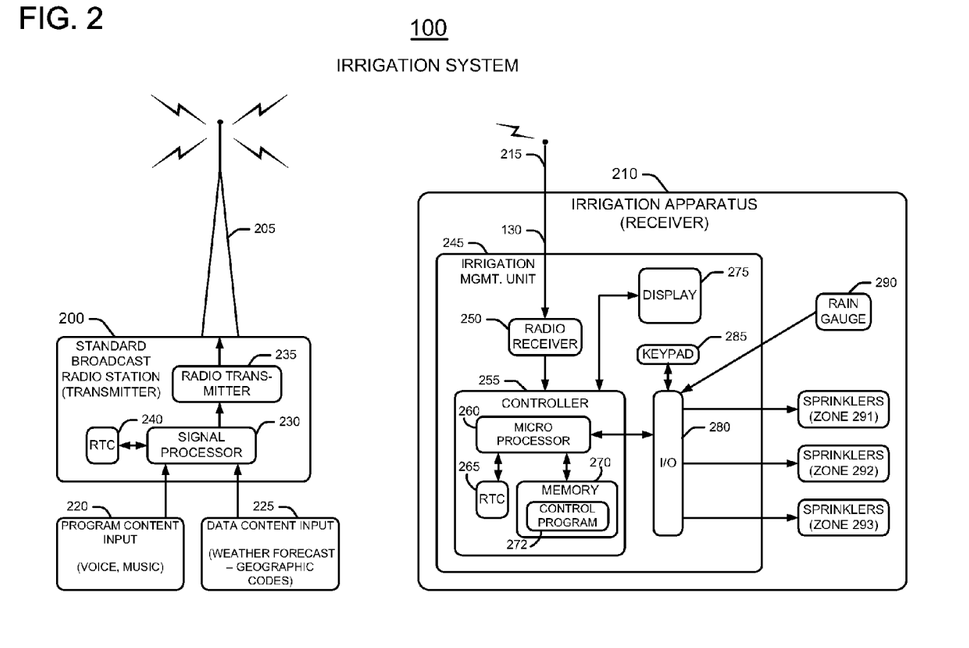
FIG. 2 is block diagram of the transmitter station and irrigation apparatus of the irrigation system of FIG. 1.

FIG. 2 is a more detailed block diagram of transmitter station 200 and irrigation apparatus 210. In this embodiment, transmitter station 200 is a standard broadcast radio FM station in the 88-108 MHz band that is capable of transmitting data content along with program content on a common radio frequency signal. Program content refers to voice, music and other content that a broadcast station typically provides to the listening audience. Data content refers to other information such as station frequency, station logo, song title, artist and other information that a standard broadcast station may also transmit along with the program content. One technology for "piggybacking" digital data content on top of program content in a standard broadcast FM station is the Radio Data System (RDS) standard. In one embodiment, transmitter station 200 employs RDS to hourly transmit as data content the list of geographic codes or sub-regions for which a forecast predicts rain within the next 24 hours.

A program content input 220 and a data content input 225 couple to a signal processor 230 in transmitter station 200 as shown. Program content input 220 supplies program content from a program content source (not shown) to signal processor 230. Data content input 225 provides digital data content (such as geographic codes) from a data content source (not shown) to signal processor 230. A standard broadcast FM radio transmitter 235 couples to signal processor 230. Broadcast antenna 205 couples to radio transmitter 235 as shown. Signal processor 230 processes the program content and data content in such a manner that transmitter 235 may wirelessly transmit both the program content and data content via FM radio signals that propagate to region 105. In one embodiment, signal processor 230 employs RDS to enable transmitter 235 to transmit both the program content and data content via the same FM radio signal. In one embodiment, signal processor 230 may modulate the data content on a subcarrier for transmission along with the program content by transmitter 235.

A real time clock (RTC) 240 couples to signal processor 230 to supply signal processor 230 with current time information. In this manner, signal processor 230 knows when to send data content to transmitter 235 for transmission. In one embodiment, signal processor 230 supplies program content to transmitter 235 for transmission at all times. However, signal processor 230 supplies data content to transmitter 235 periodically, for example once per hour or other selected time period. The data content that transmitter 235 transmits includes weather forecast information. This weather forecast information indicates the particular sub-regions in region 105 for which a weather forecast predicts rain will occur in the next 24 hours, or other selected time period. In one embodiment, the data content is a sequence or list of ZIP codes for which a weather forecast predicts rain within the next 24 hours. One way for data content input 225 to receive this information is for an operator to input the list of ZIP codes that a current weather forecast predicts will receive rain within the next 24 hours. If a more automated approach is desirable, appropriate software may parse a detailed weather forecast for region 105 and supply a list of geographic codes within region 105 for which rain is expected in the next 24 hours. In either approach, data content input 225 should receive a list of geographic codes for which the current weather forecast predicts rain within the next 24 hours.

Irrigation apparatus 210 includes an irrigation management unit 245 that includes a radio receiver 250. An installer, user or other person sets the frequency of radio receiver 250 to the frequency at which transmitter station 200 transmits. In this manner, radio receiver 250 may receive the data content from transmitting station 200 that designates those geographic codes for which the weather forecast predicts rain within the next 24 hours. A controller 255 couples to radio receiver 250 to receive this data content therefrom. Controller 255 includes a microprocessor 260 that couples to a real time clock (RTC) 265 and a memory store 270 as shown. Memory 270 includes a control program 272 that controls the operation of irrigation management unit 245. Microprocessor 260 couples to a display 275 and an input/output (I/O) interface circuit 280. An alphanumeric keypad 285 couples to I/O circuit 280 to enable an installer or user to input information and settings to control program 272 of programmable irrigation management unit 245. A rain gauge or rain sensor 290 couples to I/O circuit 280 to provide recent rain data to microprocessor 260. In this manner, microprocessor 260 receives information to indicate that rain recently occurred. I/O circuit 280 couples to watering devices such as sprinklers in watering or sprinkler zones 291, 292 and 293. Sprinklers and drip lines are examples of acceptable watering devices for use in zones 291, 292 and 293.

A user or installer uses keypad 285 to input control setup information or settings into the control program 272 of irrigation management unit 245 to activate sprinklers such as those in zones 291 292 and 293 in a programmed fashion at a scheduled time. For example, if the user or installer desires a sprinkling interval of every 5 days, then he/she inputs a selected sprinkling interval of 5 days into keypad 285. Controller 255 tracks time and counts the days until it reaches the scheduled sprinkling time at the end of the five day sprinkling interval in this example.

When controller 255 reaches the scheduled sprinkling time, control program 272 performs a test using the rain data from rain gauge 290 to determine if the sprinkler zones recently received rain. For example, if the rain gauge indicates that there is water in the rain gauge, controller 255 prevents sprinkling at the scheduled watering or sprinkling time. In this event, controller 255 resets and again starts counting the days of the selected sprinkling interval until it reaches the scheduled sprinkling time.

However, if rain gauge 290 indicates that there currently is no water in the rain gauge, control program 272 conducts a test to determine if the current weather forecast predicts rain within the next 24 hours for the particular geographic sub-region in which apparatus 210 is located. In one embodiment, control program 272 performs this test hourly which is the same rate at which transmitter station 200 updates and transmits a list of geographic sub-regions that should expect rain within the next 24 hours. Consider the case where an installer or user locates irrigation apparatus 210 within a representative geographic sub-region such as sub-region 78750. Radio receiver 250 of irrigation management unit 245 receives geographic sub-region codes from transmitter station 200 at the top of the hour. These codes are weather prediction information that indicate those geographic sub-regions for which the weather forecast indicates rain within the next 24 hours. Radio receiver 250 supplies the received geographic sub-region codes to controller 255 and control program 272. If control program 272 receives the geographic sub-region code 78750, then control program 272 prevents sprinkling at the scheduled sprinkling time. In this case the reason for preventing sprinkling is that reception of the geographic sub-region code 78750 by controller 255 indicates that sub-region 78750 should experience rain within the next 24 hours. However, if control program 272 does not receive geographic sub-region code 78750, then control program 272 sequentially activates sprinklers in zones 291, 292 and 293. In this manner, irrigation apparatus 210 conserves valuable water by preventing sprinkling when the weather forecast indicates impending rain for a particular geographic sub-region.

Figure 3:
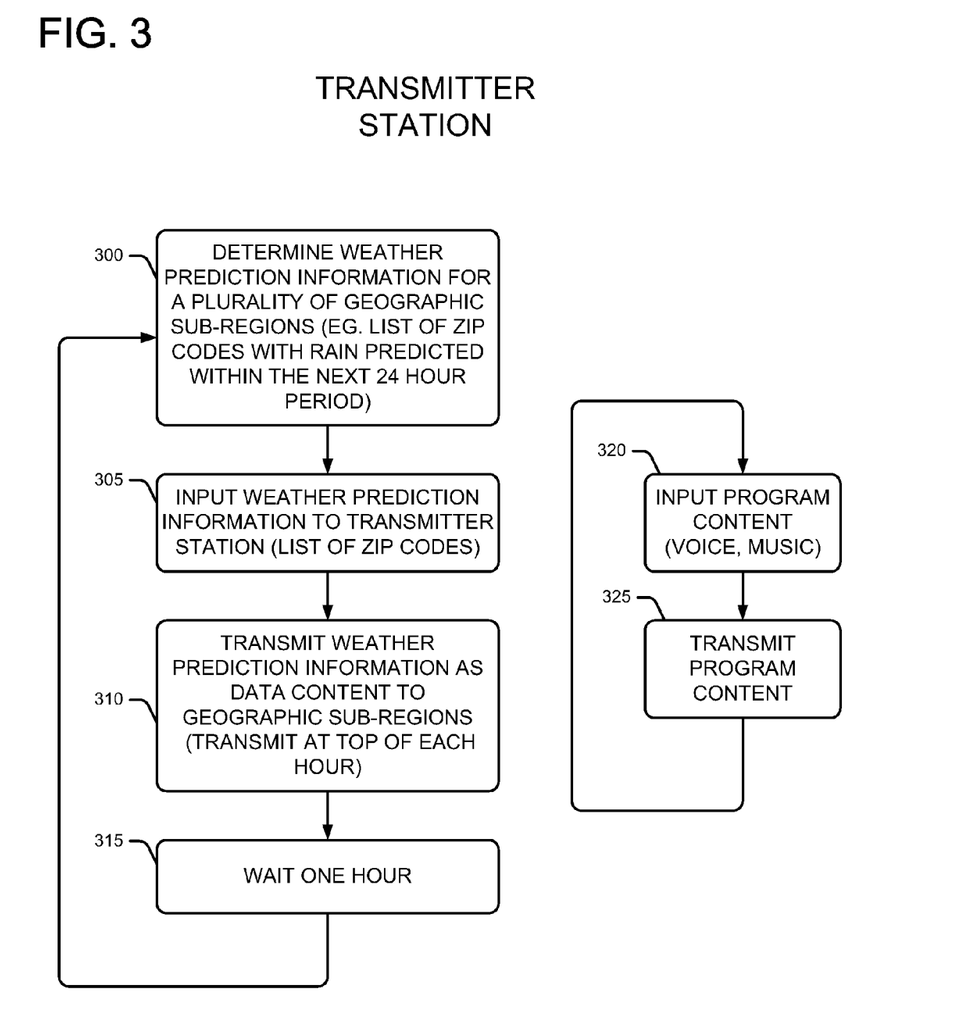
FIG. 3 is a flowchart that depicts the operation of the transmitter station of the irrigation system of FIG. 1.

FIG. 3 is a flowchart that depicts the operation of transmitter station 200. In one implementation, a station operator determines weather forecast information for a plurality of different geographic areas or sub-regions by consulting a weather forecast for the local geographic region, as per block 300. ZIP codes are an example of one type of geographic sub-region for which the operator may determine weather prediction information by consulting a weather forecast for the region. The operator then inputs the weather prediction information as data content to data content input 225 of transmitter station 200, as per block 305. For example, the weather prediction information may include a list of ZIP codes for which a weather forecast predicts rain within the next 24 hours. Alternatively, the weather prediction information may include a list of Specific Area Message Encoding (SAME) codes for which a weather forecast predicts rain within the next 24 hour time period. SAME codes are codes that the National Oceanic & Atmospheric Administration (NOAA) and National Weather Service (NWS) employ to identify geographic areas such as counties, boroughs, metropolitan areas and portions thereof for weather warning purposes. After transmission of the weather prediction information, transmitter station 200 waits for a predetermined time period such as one hour, as per block 315. When this time period expires, the process starts again at block 300. While the process of blocks 300-315 transmits weather prediction information as data content once per hour or other time period, transmitter 200 may continuously transmit program content throughout this time period. In other words, a process of inputting program content from a source as per block 320 and transmitting this program content as per block 325 continues in parallel with the process of blocks 300-315.

Figure 4A:
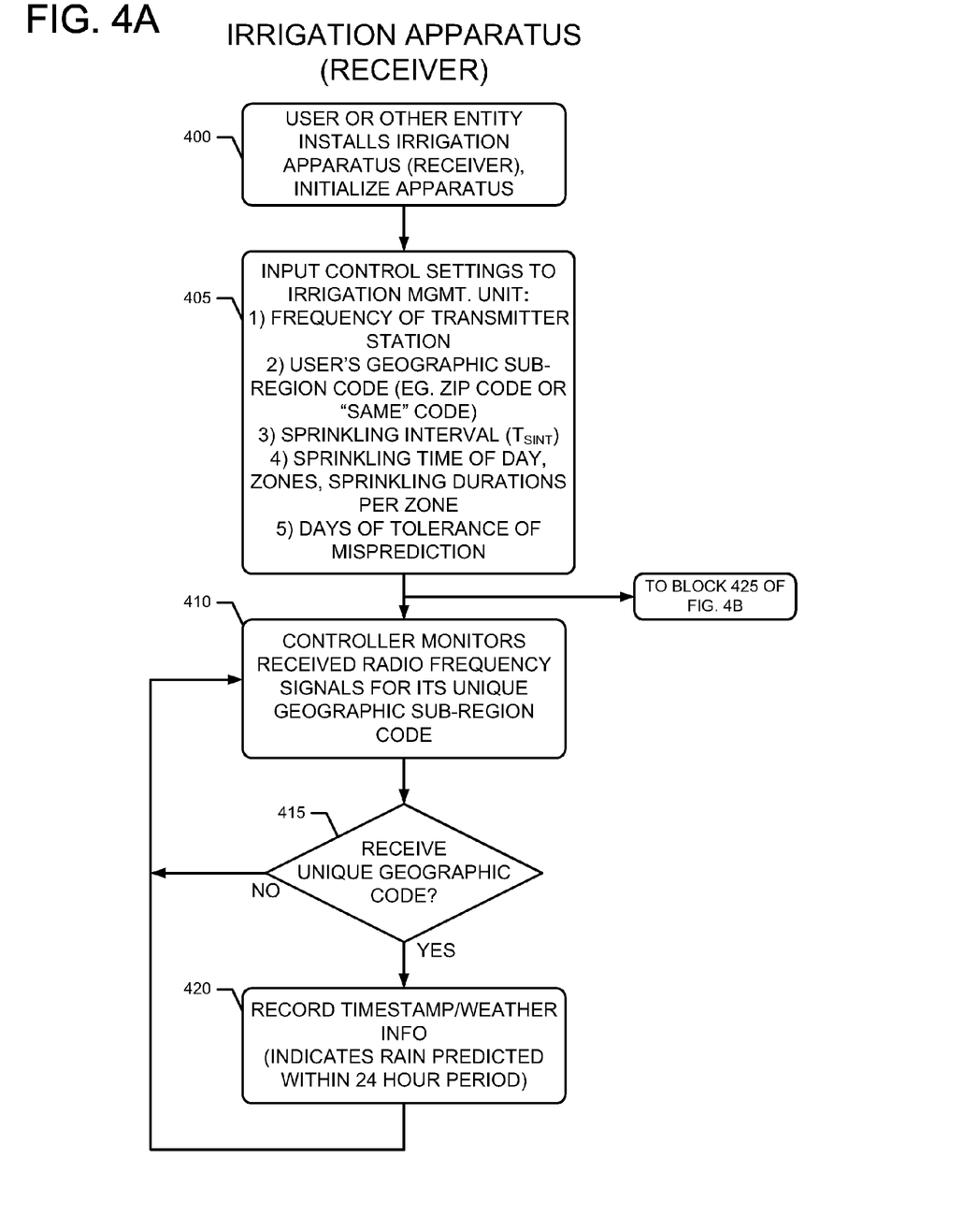
FIG. 4A is a flowchart that depicts the operation of the irrigation apparatus of the irrigation system of FIG. 1.
Figure 4B:
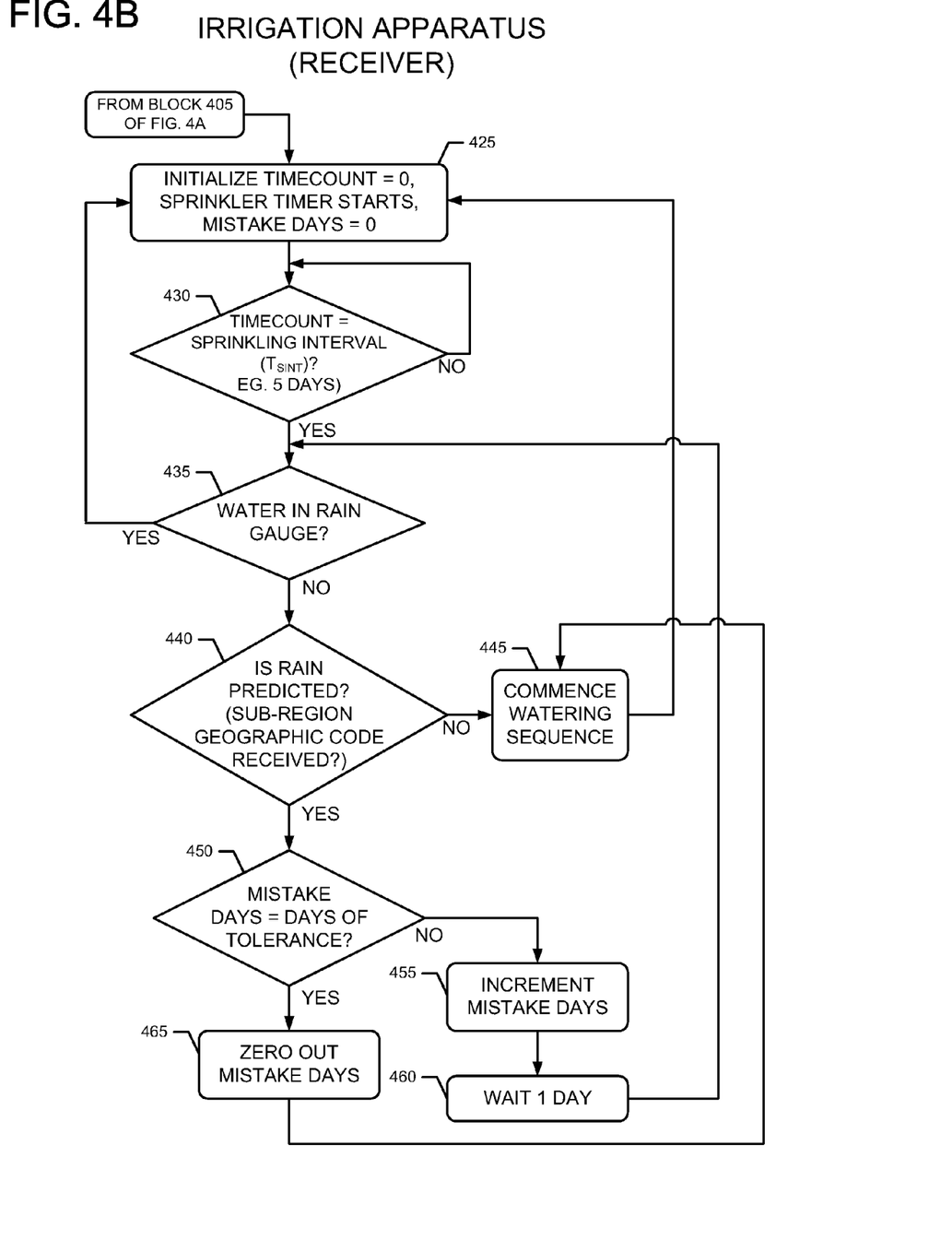
FIG. 4B is a flowchart that depicts processes that the irrigation apparatus performs in parallel with some of the processes of the flowchart of FIG. 4A.

FIGS. 4A-4B together form a flowchart that depicts process flow in irrigation apparatus 210 and the control program 272 that governs the operation of irrigation apparatus 210. An installer, user or other entity installs irrigation apparatus 210 and initializes apparatus 210, as per block 400. The installer or user then inputs control settings into keypad 285 while observing display 275 to view those settings, as per block 405. These control settings include the frequency of transmitter station 200. Setting the receive frequency of radio receiver 250 to the transmit frequency of transmitter station 200 enables irrigation apparatus 210 to receive weather prediction information. The control settings also include the geographic sub-region code of irrigation apparatus 210. In this particular example, the geographic sub-region code of irrigation apparatus 210 is 78750, namely the sub-region's ZIP code. The control settings also include the sprinkling interval, $T_{SINT}$, namely five days in this particular case. The user may also input sprinkling intervals less than or greater than five days as desired for a particular application. The control settings further include the sprinkling time of day and sprinkling time duration per sprinkling zone. If the user does not desire to water regularly at a prescribed sprinkling interval, the user may input a control setting that describes the particular day or days of the week on which the system should water. The control settings may also include a days of tolerance of misprediction value, namely the number of days that the irrigation apparatus will tolerate an error in a received weather prediction information that predicts rain before forcing the sprinklers to water.

Controller 255 monitors radio receiver 250 to detect reception of the geographic sub-region code corresponding to the particular irrigation apparatus 210, as per block 410. Controller 255 performs a test at decision block 415 to determine if radio receiver 250 receives the sub-region code unique to a sub-region of irrigation apparatus 210, namely 78750. If decision block 415 does not receive the irrigation apparatus's sub-region code, then process flow continues back to block 410 at which controller 255 continues monitoring activities. However, if decision block 415 receives the sub-region code of the particular irrigation apparatus, controller 255 records a time/date stamp for the time that controller 255 received the sub-region code, as per block 420. This sub-region code effectively provides weather prediction information that the weather forecast expects rain within 24 hours of the time of reception that the time/date stamp indicates. After recording the time/date stamp, process flow continues back to monitoring block 410. Blocks 410, 415 and 420 form a monitoring loop that executes continuously in parallel with other functions of controller 255 that the flowchart of FIG. 4B depicts.

FIG. 4B is a flowchart of a portion of control program 272 that microprocessor 260 executes concurrently with the portion of control program 272 that blocks 410-420 of FIG. 4A depict. After the user or installer inputs the control settings in block 405 of FIG. 4A, microprocessor 260 initializes and sets a variable, TIMECOUNT, to zero, as per block 425 of FIG. 4B. Microprocessor 260 starts counting time using the TIMECOUNT variable to track the amount of time transpired from the time of initialization. Microprocessor 260 also sets the number of MISTAKE DAYS, equal to zero. MISTAKE DAYS is a variable that counts the number of days that controller 255 determines a weather forecast of rain to be wrong for a particular geographic sub-region. Note that process flow continues from input control settings block 405 to both radio monitoring block 410 and sprinkler timer start block 425 in parallel. Decision block 430 performs a test to determine if the variable, TIMECOUNT, equals the sprinkling time interval, $T_{SINT}$, namely 5 days in this particular example. If decision block 430 determines that TIMECOUNT=$T_{SINT}$, this indicates that 5 days transpired since initialization of irrigation apparatus 210. Thus, it is now time to water, provided controller 255 determines that the conditions specified below are met.

Controller 255 performs a test to determine if rain gauge 290 contains water, as per block 435. If controller 255 determines that there is water in rain gauge 290, then process flow continues back to initialization block 425 because there is no need to water. The process of flowchart FIG. 4B then starts again. In one embodiment, for process flow to continue forward toward watering, controller 255 must find the condition that there is no water in rain gauge 290.

If controller 255 does find the condition that there is no water in rain gauge 290, then controller 255 conducts another test at decision block 440 to determine if receiver 250 received the sub-region geographic code (78750) for the sub-region in which irrigation apparatus 210 is located. If receiver 250 received its respective sub-region geographic code, then this indicates that the weather forecast predicts rain for this sub-region within the next 24 hours.

In the scenario where receiver 250 did not receive its respective sub-region geographic code, then controller 255 commences a watering sequence, as per block 445. Such a watering sequence may include the controller 255 cycling through sprinkler zones 291, 292 and 293 so that land in each zone receives water. When this watering sequence completes, process flow continues back to initialization block 425 and the process of FIG. 4B starts anew.

However, if controller 255 determines that receiver 250 received its respective sub-region geographic code, then controller 255 does not immediately commence watering, but rather waits to see if rain occurs as the weather prediction information predicts. In this particular example, the weather prediction information is the received sub-region code that corresponds to the geographic sub-region of the particular irrigation apparatus 210. Controller 255 conducts a test at decision block 450 to determine if the number of MISTAKE DAYS equals the DAYS OF TOLERANCE that the user specified at input control setting block 405 of FIG. 4A. Controller 255 knows that a MISTAKE DAY occurs when a day transpires for which the weather forecast predicts rain and yet block 435 indicates there is no water in the rain gauge. In this particular example, assume that the user specified three (3) DAYS OF TOLERANCE. For the first time that process flow encounters decision block 450, the number of MISTAKE DAYS equals zero (0). Thus, the number of MISTAKE DAYS does not equal the number of DAYS OF TOLERANCE, namely 3 in this example. In response to this finding, controller 255 increments the number of MISTAKE DAYS by one, as per block 455. Controller 255 waits one day, as per block 460, after which process flow continues back to rain gauge decision block 435. If decision block 450 determines that the MISTAKE DAYS=DAYS OF TOLERANCE, then the error in rain prediction exceeds the acceptable number of DAYS OF TOLERANCE. In this event, controller 255 zeros out or resets the number of MISTAKE DAYS, as per block 465, and commences the watering sequence, as per block 445. To wait longer for the weather forecast of rain to be correct could possibly cause damage to plants within the sprinkling zones. Controller 255 begins sprinkling when the number of MISTAKE DAYS equals the number of DAYS OF TOLERANCE to prevent such damage to vegetation in the sprinkling zones.

While in this particular example transmitting station 200 and radio receiver 250 operate in the standard broadcast FM band of 88 MHz to 108 MHz, it is also possible for transmitting station 200 and radio receiver 250 to operate on other frequency bands using other types of modulation. In a particularly cost effective embodiment, an existing broadcast station transmits data content that includes geographic sub-region codes along with program content. These geographic sub-region codes effectively provide weather prediction information that indicates those geographic sub-regions for which a current weather forecast predicts rain within the next 24 hours, or other predetermined time period.

In one embodiment, if the user does not specify a sprinkling interval, $T_{SINT}$, then the user may alternatively input one or more target water days per week. For example, the user may input Wednesday into keypad 285 to indicate that the user desires watering on Wednesdays. In that case, controller 255 may still check to determine if water is in the rain gauge 290 when Wednesday arrives. If water is in the rain gauge, then controller 255 skips watering on Wednesday and waits until the next Wednesday or other scheduled day to again test the rain gauge to see if watering is necessary. However, if when the scheduled watering day Wednesday arrives, controller 255 finds that there is no water in the rain gauge, then controller 255 commences watering unless a received sub-geographic code indicates rain within the next 24 hours for this particular irrigation apparatus 210.

The foregoing discloses an irrigation methodology and apparatus that seeks to reduce water waste when conducting irrigation operations.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of irrigation comprising:
   transmitting, by a transmitter station, weather prediction information to a geographic region including a plurality of geographic sub-regions, the weather prediction information including a respective geographic sub-region code for each of the geographic sub-regions for which a weather forecast predicts rain within a first predetermined time period;
   halting activation, by an irrigation apparatus in a particular geographic sub-region, of watering devices that otherwise activate to water at least one watering zone at a scheduled time, if at least one of the following conditions occurs:
      receiving, by the irrigation apparatus within the particular geographic sub-region, the respective geographic sub-region code for the particular geographic sub-region, thus indicating that rain is forecast for the particular geographic sub-region within the first predetermined time period;

sensing, by a rain sensor of the irrigation apparatus within the particular geographic region, that rain water is present in the rain sensor;

activating, by the irrigation apparatus in the particular geographic sub-region, watering devices for which activation was halted in the halting activation step, to water the at least one watering zone if the weather prediction information that indicates rain for the particular geographic sub-region is erroneous for more than a predetermined tolerance period of time; and repeating the transmitting step with updated weather prediction information including a geographic sub-region code for the particular geographic sub-region once per a second predetermined time period, the second predetermined time period being less than the first predetermined time period.

2. A method of irrigation comprising:

receiving, by an irrigation apparatus in a particular geographic sub-region of a plurality of geographic regions, radio frequency signals that include weather prediction information, the weather prediction information including geographic sub-region codes corresponding respectively to geographic sub-regions for which a weather forecast predicts rain within a first predetermined time period;

halting activation, by the irrigation apparatus in the particular geographic sub-region, of watering devices that otherwise activate to water at least one watering zone at a scheduled time, if at least one of the following conditions occurs:

receiving, by the irrigation apparatus in the particular geographic sub-region, the respective geographic sub-region code for the particular geographic sub-region, thus indicating that rain is forecast for the particular geographic sub-region within the first predetermined time period;

sensing, by a rain sensor of the irrigation apparatus in the particular geographic area, that rain water is present in the rain sensor; and activating, by the irrigation apparatus in the particular geographic sub-region, watering devices for which activation was halted in the halting activation step, to water the at least one watering zone if the weather prediction information that indicates rain for the particular geographic sub-region is erroneous for more than a predetermined tolerance period of time;

wherein the irrigation apparatus in the particular geographic sub-region receives updated weather prediction information including a geographic sub-region code for the particular geographic sub-region once per a second predetermined time period, the second predetermined time period being less than the first predetermined time period.

3. An irrigation apparatus, comprising:

a radio receiver that receives radio frequency signals that include weather prediction information, the radio receiver being usable in a particular geographic sub-region of a plurality of geographic sub-regions, the weather prediction information including geographic sub-region codes corresponding respectively to geographic sub-regions for which a weather forecast predicts rain within a first predetermined time period;

a controller, coupled to the radio receiver, that activates watering devices coupled to the controller to water at least one watering zone at a scheduled time, the controller halting activation of the watering devices at the scheduled time if at least one of the following conditions occurs:

a) the radio receiver receives the geographic sub-region code of the particular sub-region in which the irrigation apparatus is located, thus indicating that rain is forecast for the particular geographic sub-region within the first predetermined time period; and b) the controller determines that rain water is present in a rain sensor coupled to the controller;

wherein the controller activates watering devices for which activation was previously halted by the controller, to water the at least one watering zone if the weather prediction information that indicates rain for the particular geographic sub-region is erroneous for more than a predetermined tolerance period of time;

wherein the radio receiver receives updated weather prediction information including a geographic sub-region code for the particular geographic sub-region once per a second predetermined time period, the second predetermined time period being less than the first predetermined time period.

* * * * *